(12) United States Patent
Bloch et al.

(10) Patent No.: US 7,040,506 B2
(45) Date of Patent: May 9, 2006

(54) FASTENER STACKING AND REMOVAL SYSTEM

(75) Inventors: Daniel D. Bloch, St. Peters, MO (US); William P. Miller, St. Peters, MO (US); Jason D. McGahey, St. Peters, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/153,102

(22) Filed: Jun. 15, 2005

(65) Prior Publication Data

US 2005/0242106 A1 Nov. 3, 2005

Related U.S. Application Data

(62) Division of application No. 10/618,453, filed on Jul. 11, 2003, now Pat. No. 6,959,835.

(51) Int. Cl.
*B65G 59/00* (2006.01)

(52) U.S. Cl. .................................. 221/278; 227/112

(58) Field of Classification Search ............... 221/278, 221/165, 298, 95; 227/112, 111, 110, 107, 227/109, 119; 406/191, 86, 192
See application file for complete search history.

(56) References Cited

U.S. PATENT DOCUMENTS 5,011,339 A * 4/1991 Aurtoi et al. ............... 406/191

* cited by examiner

*Primary Examiner*—Kenneth Noland
(74) *Attorney, Agent, or Firm*—Harness Dickey & Pierce P.L.C.

(57) ABSTRACT

A system is provided for delivering fasteners to a work station. The system includes at least one fastener storage device than has at least one storage tube. The system additionally includes at least one fastener spacer that is adapted to properly orient at least one fastener stored in the storage tube. The system further includes at least one unloading mechanism that includes at least one extractor catcher. The unloading mechanism is adapted to remove the spacer and the fastener from the storage tube in a single operation.

17 Claims, 14 Drawing Sheets

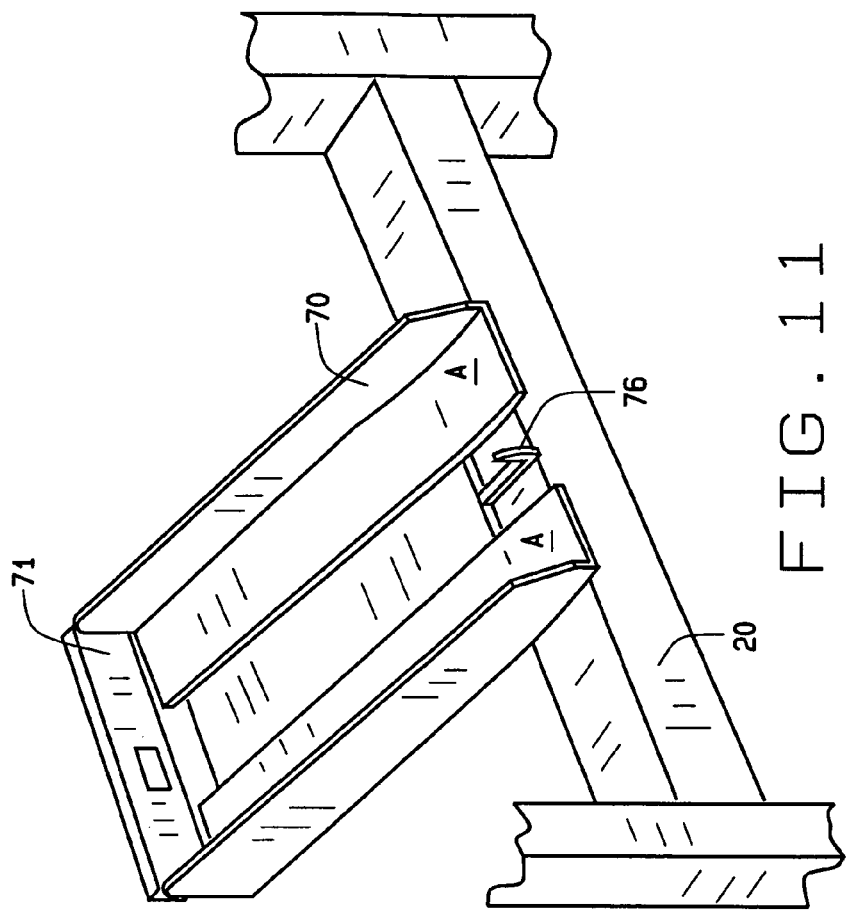
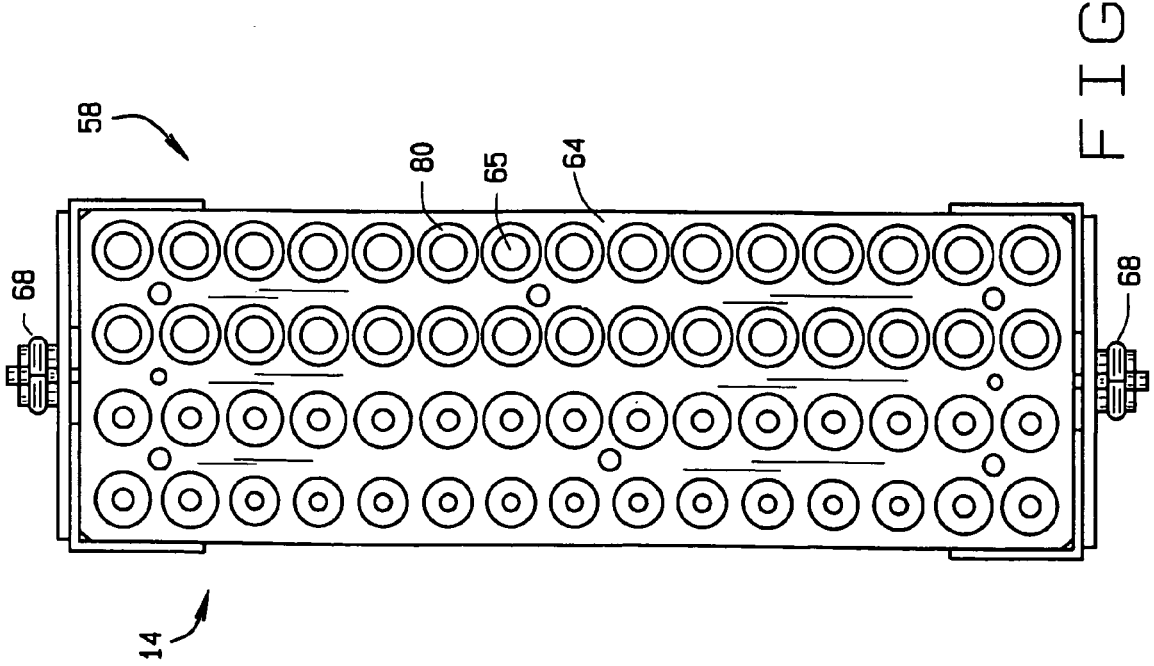
FIG. 11
FIG. 10

FASTENER STACKING AND REMOVAL SYSTEM

CROSS REFERENCE TO RELATED APPLICATIONS

This application is a divisional of U.S. patent application Ser. No. 10/618,453 filed on Jul. 11, 2003 now U.S. Pat. No. 6,959,835. The disclosure of the above application is incorporated herein by reference.

FIELD OF THE INVENTION

The present invention relates generally to automated fastening equipment and more particularly to a fastener stacking and removal system for use in the automated fastening equipment.

BACKGROUND OF THE INVENTION

In the production assembly of aircraft, the majority of substructure such as fuselage frames and longerons, along with wing spars and ribs, are joined to the skin of the aircraft with thousands of fasteners. Further, a plurality of fastener types, along with variations in diameters and grip lengths, are typically used in an aircraft assembly or subassembly. (Generally, a fastener grip length refers to the cumulative thickness of the parts that the fastener holds together). Moreover, a majority of the substructure parts are manually assembled and are not assembled using automated fastening equipment.

Automated fastener delivery systems that automatically deliver fasteners to a workpiece, or a fastening device, have been employed in various ways to simplify the fastener retrieval process in various types of automated fastener installation systems. Some of these known automated fastener delivery systems involve various types of storage devices and vibratory feed bowls that utilize different types of escapements for feeding fasteners through a tube to different types of fastening devices. Such known fastener delivery systems are typically employed in high rate production environments that have relatively large assembly systems permanently installed at a fixed location within a production facility. The equipment generally comprises a storage device for the fasteners and a mechanism or system that retrieves fasteners from the storage device and transports the fasteners to the workpiece or fastening device.

In at least one known fastener delivery system fastener storage cartridges are utilized to cache the fasteners before delivery to a fastener installation device or the like with pressurized air. Typically, the fastener cartridges comprise at least one tube in which the fasteners are stacked longitudinally end to end. The fastener cartridges are filled off line either by hand are automatically. The fasteners are then removed from the various storage tubes or cartridges and delivered through a common passageway to the fastener installation tool. However, this type of known fastener delivery system requires a separate fastener escapement mechanism to remove and deliver the fasteners. Additionally, often the shape of the fasteners are not suitable for stacking end to end in the fastener storage tubes, which causes the fasteners to jam in the storage tubes. At least one known fastener delivery system has employed spacers between each fastener to prevent the fasteners from jamming. However, this consumes space within the storage tubes, thereby reducing the number of fasteners each tube/cartridge can hold. Additionally, each spacer has to be removed from the cartridge before a subsequent fastener can be removed, thereby impeding the rate at which fasteners can be delivered to the fastener device.

Accordingly, a need remains in the art for an automated fastener delivery system that is portable, includes a fastener storage system in which the fasteners do not jam, and efficiently delivers the fasteners to at least one work station or tool in a timely manner.

SUMMARY OF THE INVENTION

In one preferred form, the present invention provides a portable fastener delivery system that comprises an unloading mechanism in communication with a fastener storage device, wherein a control system activates the unloading mechanism to remove a specific fastener style from the fastener storage device and transport the fastener to a delivery conduit, where the fastener is caused to be delivered to a work station. Generally, the unloading mechanism, fastener storage device, control system, and delivery conduit are disposed within a portable platform such as a mobile cart so that the fasteners may be delivered to a plurality of work stations located throughout a manufacturing facility.

The fasteners are stored in the fastener storage device having a spacer placed between each fastener. Each spacer includes a recess in which a mandrel of a related fastener fits. The spacers prevent the fasteners from jamming in the storage device, thereby allowing for easy retrieval of the fasteners. Additionally, the recess in each spacer has depth that extends a substantial distance into the spacer such that an end wall of the spacer is relatively thin. In addition to the spacers preventing the fasteners from jamming, the thin end wall creates only a slight separation between the mandrel of each fastener from a head of an adjacent fastener. Thus, the spacers consume very little space within the storage device, thereby allowing more fasteners to be stored in the storage device.

The control system further employs a pneumatic source to remove the fasteners and spacers from the fastener storage device. Generally, the pneumatic source removes the spacers and the fasteners from the fastener storage device by activating a vacuum generator that draws a spacer and a fastener into the unloading mechanism. The spacers are sized such that the spacer passes through the unloading mechanism and is deposited in a storage receptacle. The fasteners are retained in an extractor catcher device of the unloading mechanism while the unloading mechanism is positioned adjacent the delivery conduit. Once the unloading mechanism is positioned adjacent the delivery conduit, the vacuum generator is deactivated, and the fastener is dropped into the delivery conduit. The pneumatic source is then activated to deliver the fastener to a work station using pressurized air through the delivery conduit.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 10 is a top view of a fastener storage device in accordance with the present invention;

FIG. 11 is an perspective view of a fastener cassette cradle and a fastener cassette locating system in accordance with the present invention;

DETAILED DESCRIPTION OF THE PREFERRED EMBODIMENTS

The following description of the preferred embodiments is merely exemplary in nature and is in no way intended to limit the invention, its application, or uses.

Figure 1:
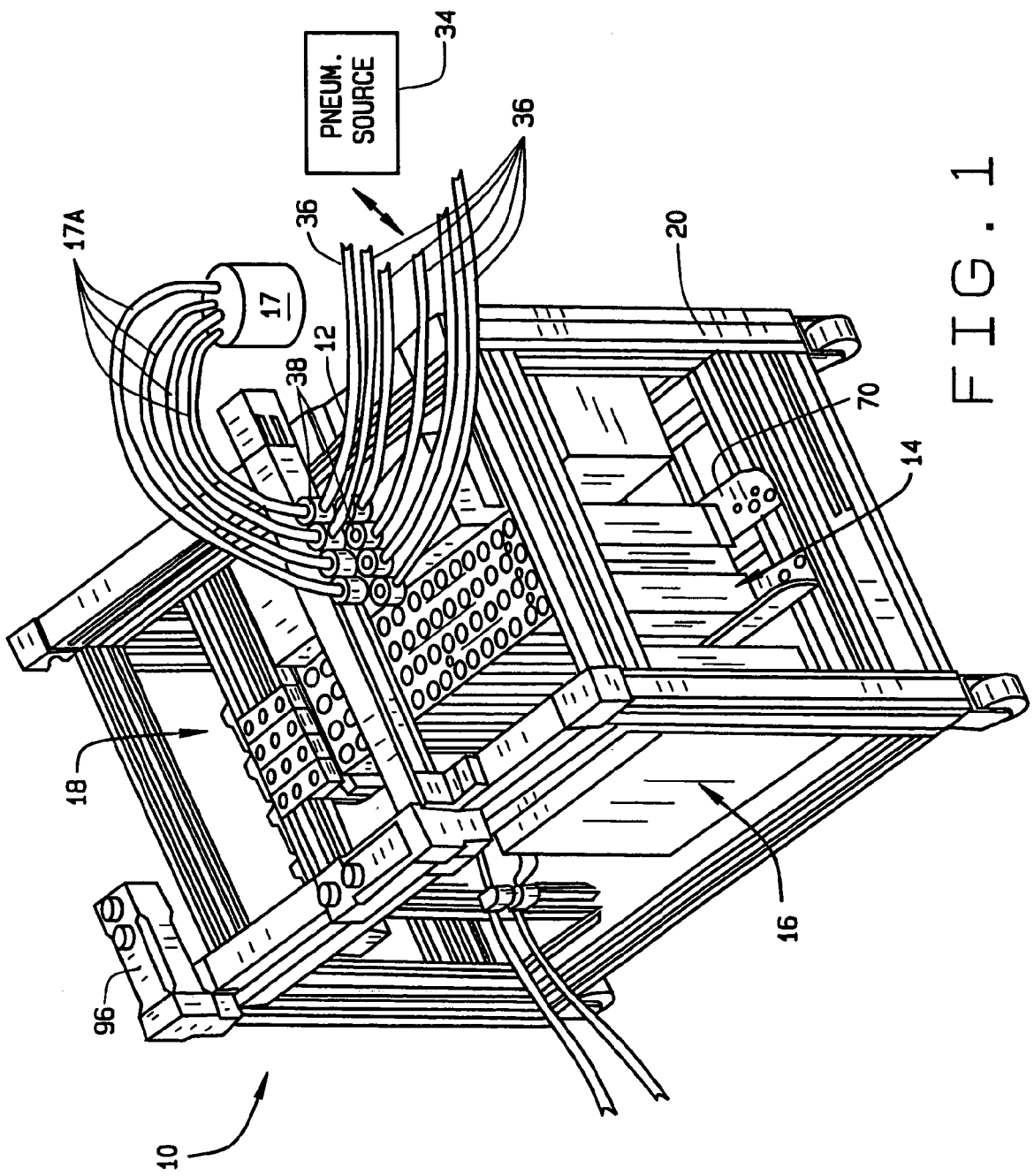
FIG. 1 is an perspective view of a portable fastener delivery system in accordance with the present invention.
Figure 2:
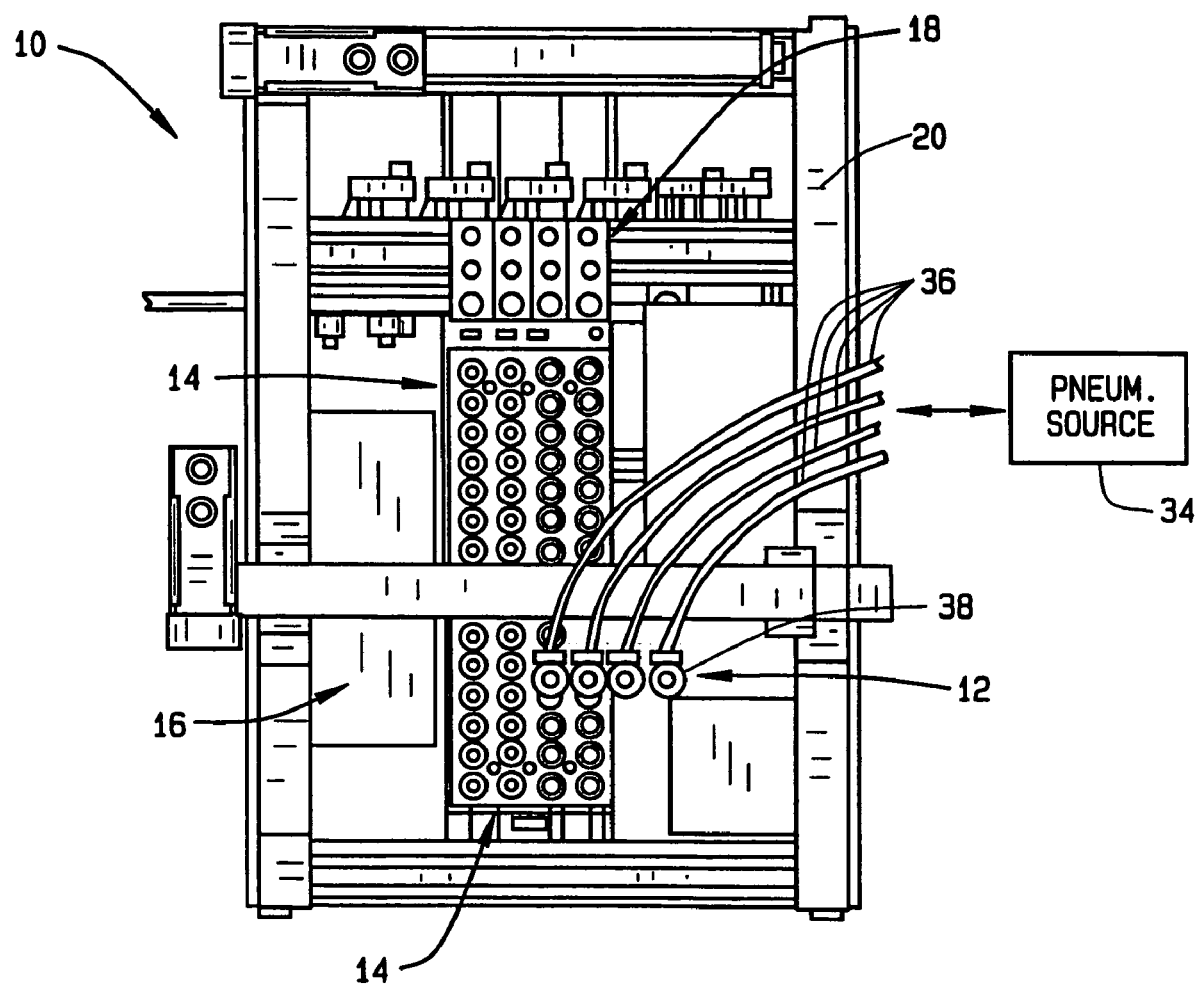
FIG. 2 is a top view of a portable fastener delivery system in accordance with the present invention.

Referring to the FIGS. 1 and 2, a portable fastener delivery system according to the present invention is illustrated and generally indicated by reference numeral 10. The portable fastener delivery system 10 includes an unloading mechanism 12 in communication with a fastener storage device 14. The portable fastener deliver system 10 also includes a control system 16 that causes the unloading mechanism 12 to remove a fastener and a related fastener spacer from the fastener storage device 14. More specifically, the control system selects a desired fastener having a specific configuration from the fastener storage device 14. The desired fastener and related spacer are removed from the fastener storage device 14. The spacer is transported through the unloading mechanism 12 and deposited in a storage receptacle 17 for recycling, via spacer transport tubes 17a. The fastener is transported to a delivery conduit 18, wherein the fastener is delivered to a work station.

As shown, the portable fastener delivery system 10 is disposed within a portable platform such as a mobile cart 20 so that a variety of fasteners may be delivered to one or more work stations located throughout a manufacturing facility. As described above the spacer(s) are deposited in the storage receptacle 17. The storage receptacle 17 can be removably coupled to the cart 20, or be conveniently located separate from the cart 20. Additionally, the storage receptacle 17 can be any receptacle suitable for receiving and storing the spacer. For example, the storage receptacle can be a bag, a basket, a box, or a canister.

Figure 3:
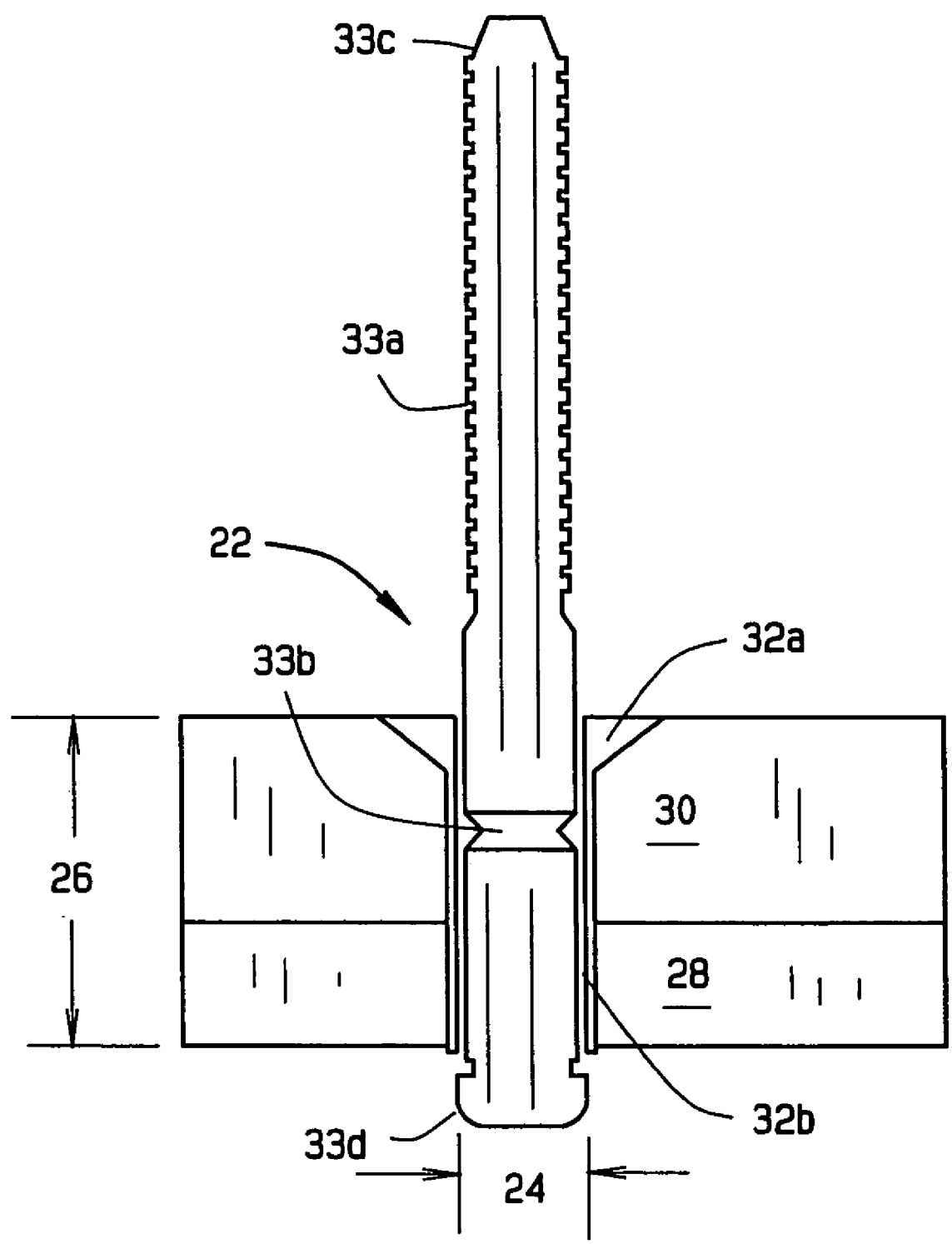
FIG. 3 is a cross-sectional view of a typical fastener installation in accordance with the present invention.

For purposes of clarity, a fastener 22 is illustrated in FIG. 3 in order to define terminology as used herein. The fastener 22 can be any fastener desired to be transported to a work station via the fastener delivery system 10, e.g. a Huck Ti-Matic®, as shown. The fastener 22 generally comprises a diameter 24, and a grip length 26, wherein the grip length 26 is approximately equal to the cumulative thickness of the parts 28 and 30 that the fastener 22 holds together. The fastener 22 also comprises a head 32a and a sleeve 32b. The head 32a may be flush or countersunk as shown, among other variations including, but not limited to, protruding heads. The fastener 22 further comprises a mandrel 33a having a break neck 33b, a tail end 33c and a head end 33d.

Referring again to FIGS. 1 and 2, the portable fastener 22 delivery system 10 generally removes and delivers fasteners 22 and spacers using a pneumatic source 34. Operation of the pneumatic source 34 is controlled by the control system 16 and is in communication with both the unloading mechanism 12 and the delivery conduit 18 through flexible tubing 36. The pneumatic source 34 activates one or a plurality of vacuum generators 38 to remove a fastener 22 and a related spacer from the fastener storage device 14. The vacuum generators 38 then transport the spacer to the storage receptacle 17 and secure the fastener 22 within the unloading mechanism 12 as more fully described below. Once the fastener 22 is retained within the unloading mechanism 12, the control system positions the unloading mechanism 12 adjacent the delivery conduit 18, wherein the vacuum generators 38 are deactivated and the fastener 22 is transported through the delivery conduit 18 by gravity and by pressurized air from the pneumatic source 34 as described in greater detail below.

Delivery Conduit

Figures 4, 5:
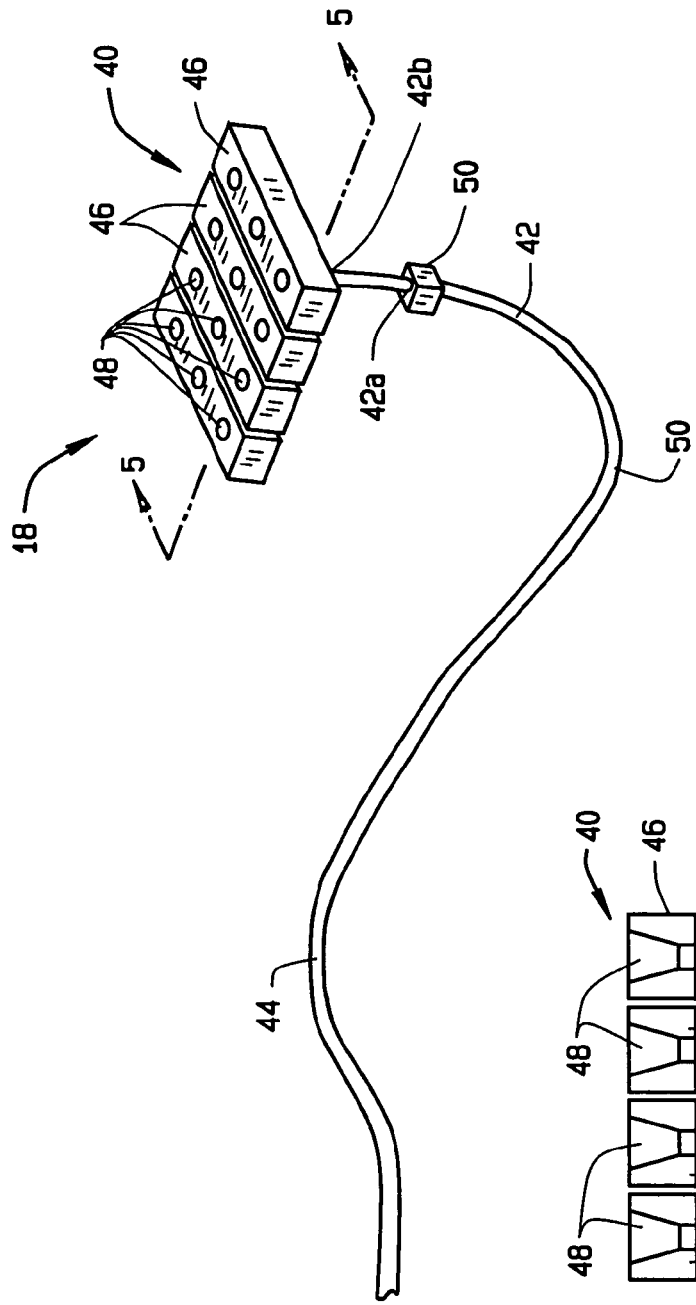
FIG. 4 is an orthogonal view of a delivery conduit in accordance with the present invention.
FIG. 5 is a cross-sectional view, taken along line 5—5 of FIG. 4, of a delivery conduit in accordance with the present invention.

Referring to FIGS. 4 and 5, the delivery conduit 18 further comprises a drop station 40 in communication with a fixed fastener delivery tube 42 coupled to a flexible fastener delivery tube 44. As shown, the drop station 40 further comprises a plurality of drop plates 46 that define chutes 48, through which the fasteners 22 are dropped. In one preferred embodiment, the chutes 48 are tapered as shown, although a variety of shapes may be employed to effectuate transport of the fastener 22 through the delivery conduit 18. The plurality of drop plates 46 are employed to facilitate rapid interchangeability for a variety of fastener 22 configurations. Alternately, a single drop plate may be employed rather than the plurality of drop plates 46 as shown.

As further shown, the fixed fastener delivery tube 42 extends from the drop station 40 and is in communication with the flexible fastener delivery tube 44. Generally, a fastener 22 is transported through fixed fastener delivery tube 42 by gravity until the fastener 22 passes beyond a proximity sensor 50. When the proximity sensor 50 detects the presence of a fastener 22, the proximity sensor 50 notifies the control system 16, and the control system 16 then activates the pneumatic source 34. Accordingly, the pneumatic source 34 provides pressurized air through the flexible fastener delivery tube 44 to deliver the fastener 22 to the work station. The proximity sensor can be located anywhere along the length of the fixed fastener delivery tube 42. The location of the proximity sensor 50 along the length of the fixed fastener delivery tube 42 will effect how quickly the delivery system 10 detects the presence of a fastener 22. For example, if the proximity sensor 50 is located at or near a distal end 42a of the fixed fastener delivery tube 42, the presence of the fastener will not be detected as quickly as it would if the proximity sensor 50 was located at or near a proximal end 42b of the fixed fastener delivery tube 42.

In one preferred embodiment, the fixed fastener delivery tube 42 is rigid in order to facilitate efficient transport of the fastener 22 by gravity. Accordingly, the fixed fastener delivery tube 42 can be fabricated from aluminum tube stock or other rigid material commonly known in the art. The flexible fastener delivery tube 44, as the name implies, is flexible so that the fastener 22 may be delivered to a plurality of work stations throughout a manufacturing facility. Accordingly, the length of the flexible fastener delivery tube 44 may be varied to accommodate the required distance from the portable fastener delivery system 10 to the work station. The amount of time that the pneumatic source 34 needs to provide pressurized air through the flexible fastener delivery tube 44 is a function of the length of the delivery tube and the fastener 22 configuration being delivered. Therefore, the amount of time that pneumatic source 34 is activated can be adjusted according to the length of the flexible fastener delivery tube 44.

Additionally, the inner diameter of the flexible fastener delivery tube 44 is be sized appropriately to prevent tumbling of the fastener 22 along the length thereof, which is generally a function of the overall size of the fastener 22. Generally, the inner diameter of the flexible fastener delivery tube 44 should be slightly larger than the diameter of the fastener head 32a yet smaller than the overall length of the fastener 22 to prevent tumbling. Further, the flexible fastener delivery tube 44 is preferably fabricated from relatively soft and flexible plastic such as nylon with a relatively smooth inner surface to minimize friction between the fastener 22 and the inner wall of the flexible fastener delivery tube 44.

The delivery conduit 18 may further comprise a plurality of drop stations 46, fixed fastener delivery tubes 42, and flexible fastener delivery tubes 44 according to the requirements of a specific manufacturing assembly. Accordingly, the illustration of four drop stations 46 and corresponding fixed fastener delivery tubes 42 and flexible fastener delivery tubes 44 shall not be construed as limiting the scope of the present invention.

Fastener Storage Device

Referring now to FIGS. 6–10, the fastener storage device 14 according to the present invention generally comprises a fastener cassette 58 defining a plurality of fastener storage tubes 60 housed within a frame 62. Each fastener storage tube 60 preferably houses a specific fastener 22 configuration, i.e. type, diameter, and grip length, and the fastener storage tubes 60 are secured within the fastener cassette 58 to an upper plate 64 and a lower plate 66. In one preferred embodiment, the fastener storage tubes 60 are a semi-rigid plastic and thus may be flexed slightly to be inserted into upper apertures 65 formed in the upper plate 64 and lower apertures 67 formed in the lower plate 66. Additionally, in one preferred embodiment, the upper apertures 65 and the lower apertures 67 are chamfered to facilitate installation and removal of the fastener storage tubes 60. The fastener storage tubes 60 are also preferably vented to atmosphere at their lower ends to facilitate generation of a lifting force within the fastener storage tube 60 by the vacuum generator.

Figure 7:
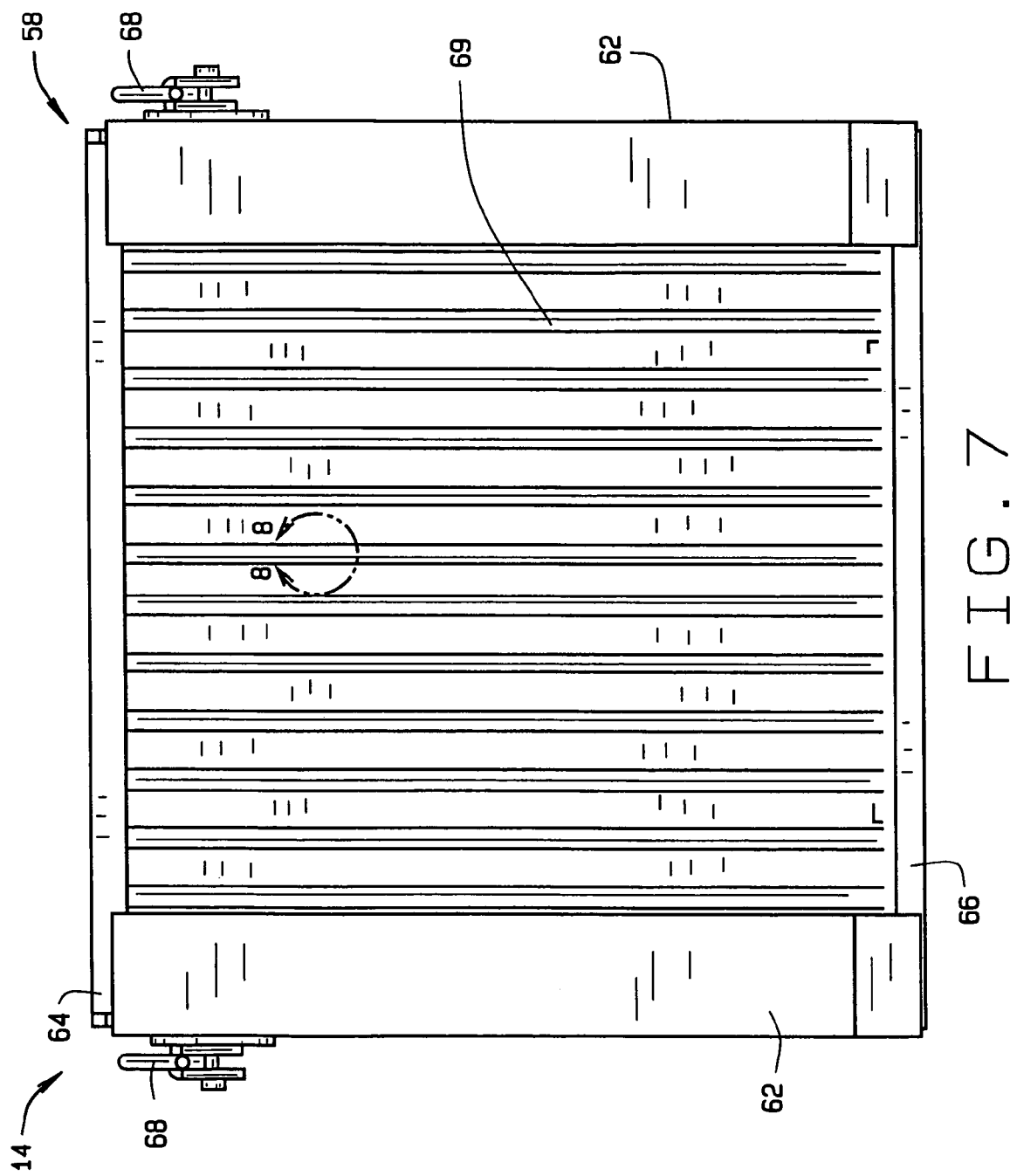
FIG. 7 is a side view of a fastener storage device in accordance with the present invention.
Figure 7A:
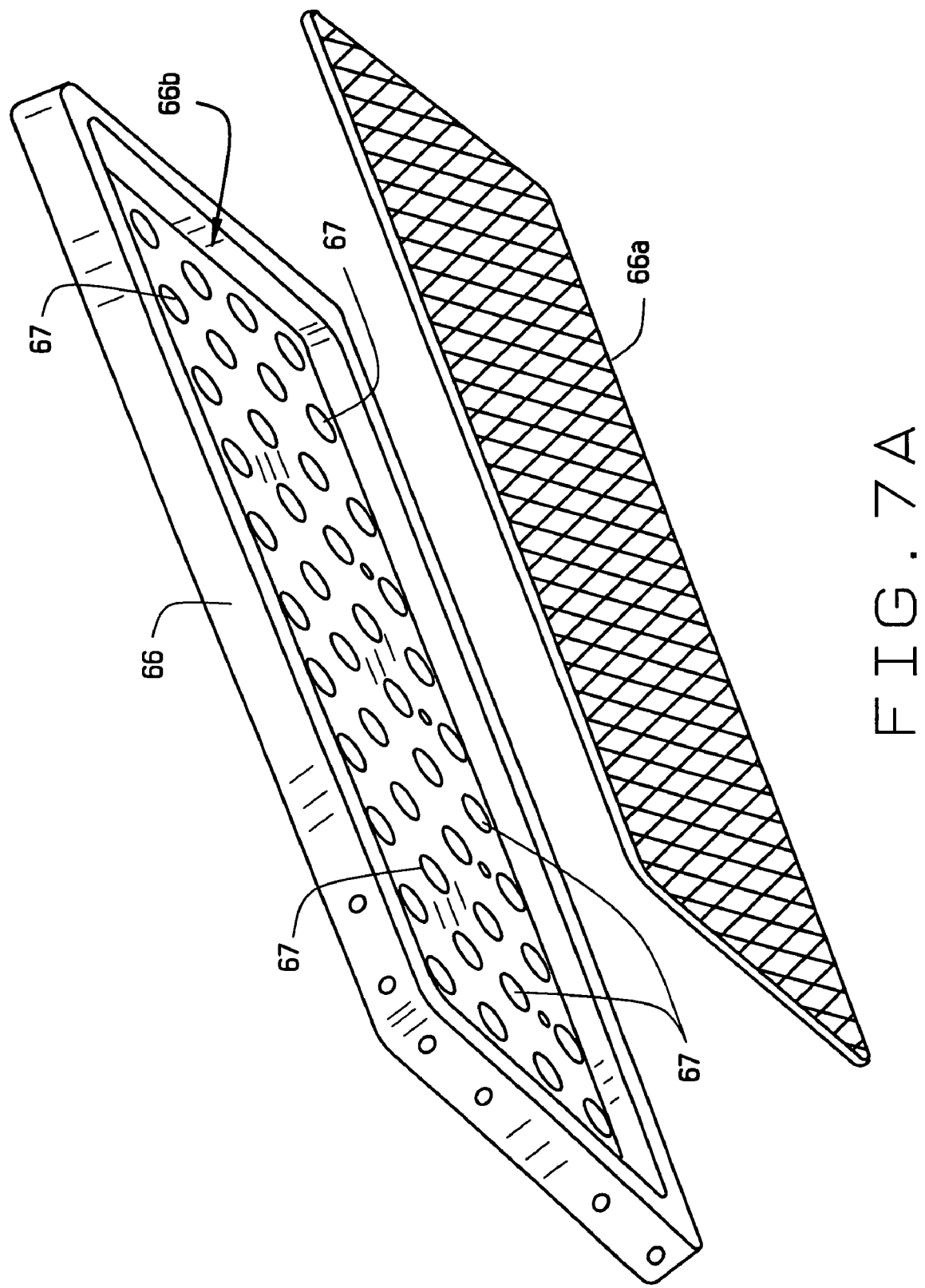

In another preferred embodiment, the apertures 65 of the upper plate 64 are counter bored from an underside of the upper plate 64. Additionally, the apertures 67 of the lower plate 66 are sized to allow the tubes 60 to pass therethrough. In this embodiment, the tubes 60 are installed in the cassette 58 by inserting the tubes 60 through the lower plate apertures 67. Once the tubes 60 are passed through the lower plate apertures 67, the top of each tube 60 is fitted within the counter bores of an upper plate aperture 65. The inside diameter of the non-counter bored portion of the upper plate apertures 65 is substantially equal to the inside diameter of the each related tube 60. As shown in FIG. 7A, a backing plate 66a is then fastened within a recess 66b in a bottom side of the lower plate 66. The recess 66b covers the area of the bottom side of the lower plate 66 that includes all the lower plate apertures 67. Accordingly the backing plate 66a is sized to fit within the recess 66b such that when the backing plate 66a is fastened within the recess 66b, all the tubes 60 are held within the fastener cassette 58. The backing plate 66a is adapted to allow air to be drawn through each tube 60 such that the air will lift the fasteners 21 and spacers 61 out of the tubes 60 for removal. For example, the backing plate 66a could be a screen, a grate, a grill, or a perforated metal sheet. The tubes 60 are then loaded with the fastener 22 and the spacer 61 as described above. Alternatively, the tubes 60 can be preloaded with the fasteners 22 and the spacers 61 prior to installing the tubes 60 into the cassette 58.

Figure 8:
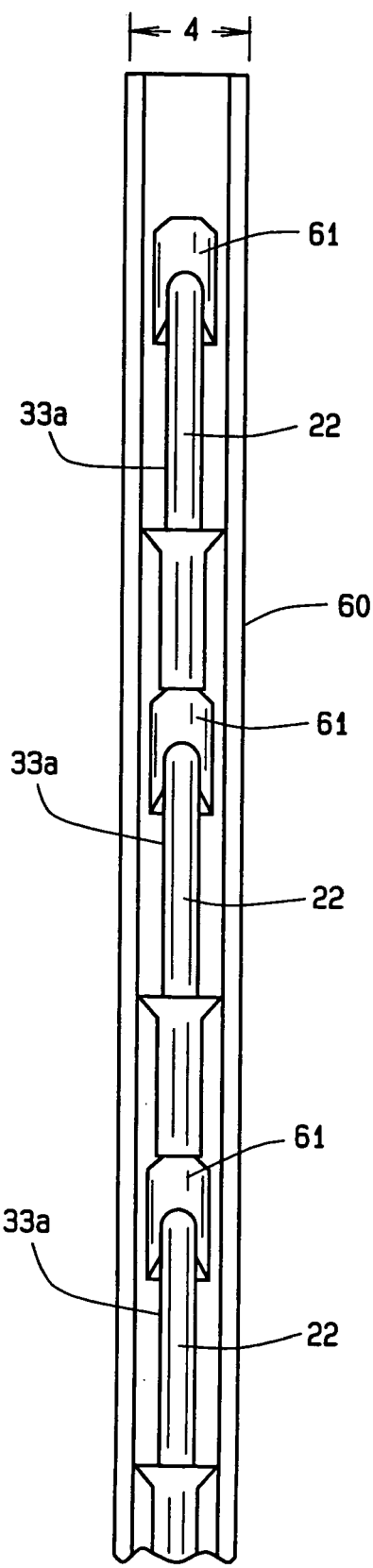
FIG. 8 is an enlarged cross-sectional view, taken from view 8—8 of FIG. 7, of a fastener storage tube housing a plurality of fasteners in accordance with the present invention.
Figure 9:
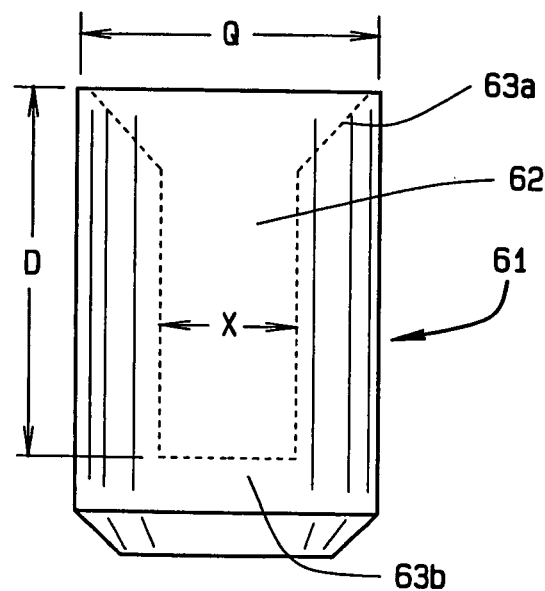
FIG. 9 is a side view of a fastener spacer in accordance with the present invention.

Referring to FIGS. 8 and 9, in one preferred embodiment, the fasteners 22 are stacked end-to-end and generally rest within the fastener storage tube 60 as shown. A spacer 61 is positioned between each fastener 22 to prevent the fasteners 22 from becoming lodged in the fastener storage tube 60 such that the unloading mechanism 12 can not remove the fasteners 22 from the fastener storage tube 60. The spacers 61 include a recess 62 having a chamfered upper portion 63a. After each fastener 22 is loaded in the fastener storage tube 60 a spacer 61 is inserted into the tube such that the recess 62 loosely fits around the tail end 33c of the mandrel 33a. The chamfered upper portion 63a provides a self-locating feature that allows the tail end 33c of the mandrel 33a to be positioned within the recess 62 without manipulating the fastener 22 or the spacer 61. Additionally, an inside diameter X of the recess 62 is preferably slightly larger than an outside diameter Y of the mandrel 33a so that the spacer 61 has a slightly loose fit on the mandrel 33a. Therefore, after each fastener 22 is loaded in the tube, a spacer 61 is dropped into the storage tube 60, whereby the chamfered upper portion 63a and inside diameter X allow the spacer 61 to easily self-locate on the tail end 33c of the mandrel 33a. Additionally, an outside diameter Q of the spacer 61 is sized appropriately to allow the spacers 61 to be transported to the storage receptacle 17, as described further below.

Additionally, the recess 62 in each spacer 61 has depth D that extends a substantial distance into the spacer 61 such that an end wall 63b of the spacer 61 is relatively thin. Therefore, in addition to the spacers 61 preventing the fasteners 22 from jamming in the storage tube 60, the thin end wall 63b creates only a slight separation between the tail end 33c of the mandrel 33a of each fastener 22 and the head end 33b of the mandrel 33a of an adjacent fastener 22. Thus, the spacers 61 consume very little space within the storage tube 60, thereby allowing more fasteners 22 to be stored in the fastener storage device 14.

The inner diameter of the fastener storage tube 60 is preferably sized appropriately to prevent tumbling of the fasteners 22 and to allow for ease of loading, either manually or automatically, of the fasteners 22 within the fastener storage tube 60. In one preferred embodiment, the fastener storage tubes 60 are a clear, semi-rigid plastic such as polyvinyl, however, other materials commonly known in the art may also be employed, for example reinforced rubber or nylon.

Figure 6:
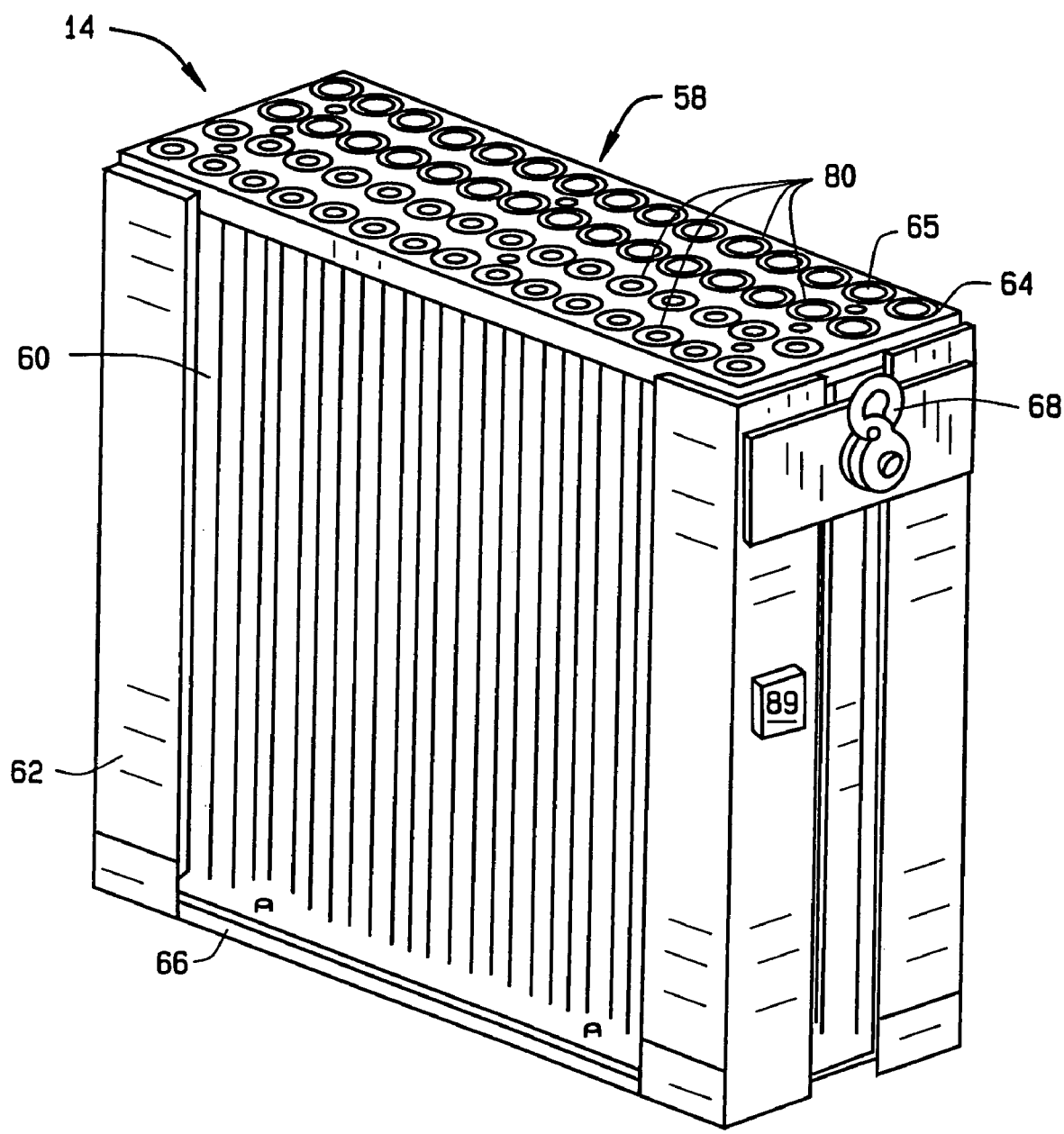
FIG. 6 is an orthogonal view of a fastener storage device in accordance with the present invention.

As further shown in FIGS. 6 and 10, the upper plate 64 further comprises a plurality of seals 80 disposed around the upper apertures 65. The seals 80 are preferably seated within a counterbore (not shown) in the upper plate 64 and are further adhesively bonded therein. Additionally, the seals 80 may be disposed within the counterbore with an interference fit. Generally, the seals 80 are employed to provide a sealed connection between the fastener storage tube 60 and the unloading mechanism 12 when a fastener is being removed from a fastener storage tube 60 as described in greater detail below. Accordingly, the seals 80 in one form are rubber, although other materials commonly known in the art may also be employed.

The fastener cassette 58 may comprise a plurality of fastener storage tubes 60 having different diameters to accommodate a variety of different fastener configurations. The exemplary fastener cassette 58 shown is capable of housing up to 60 variations of fastener type, diameter, and grip length with the use of 60 fastener storage tubes 60. Additionally, different fastener cassettes 58 may be employed that contain a predetermined set of fastener configurations. Accordingly, the overall size of fastener cassette 58 may be larger or smaller than the embodiment illustrated herein, and the use of four (4) different diameters and fifteen (15) rows for a total of sixty (60) fastener storage tubes 60 should not be construed as limiting the scope of the present invention.

The fastener storage tubes 60 may further be oriented according to specific application requirements and are not limited to a vertical configuration as described herein. For example, the fastener storage tubes 60 may be canted at an angle (not shown), or may be coiled (not shown) to reduce space requirements, among other configurations. Additionally, the fastener storage tubes 60 may be housed within fastener tube cartridges (not shown) that are removable from the fastener cassette 58 in order to efficiently replace fastener configurations as necessitated by a particular assembly. Similarly, the upper plate 64 and a lower plate 66 as previously described may also be removable to accommodate a variety of different fastener configurations as required.

In one preferred embodiment, the fastener cassette 58 is removable from the portable fastener delivery system 10. Accordingly, the fastener cassette 58 further comprises handles 68 as shown for installation, transport, and removal thereof. Furthermore, the fastener cassette 58 is inserted within the portable fastener delivery system 10 along a fastener cassette cradle 70, which is mounted to the frame 20 as shown in FIG. 11. The fastener cassette 58 is positioned on the fastener cassette cradle 70 at position A and is slid along the fastener cassette cradle 70 into position against stop 71. The fastener cassette 58 is then secured in place using the pivoting latch 76, which engages the lower plate 66 of the fastener cassette 58 as described in greater detail below. Accordingly, the fastener cassette 58 is slidably disposed along the fastener cassette cradle 70. Proper positioning of the fastener cassette 58 within the fastener cassette cradle 70 is communicated to the control system 16.

To remove the fastener cassette 58, the pivoting latch 76 is rotated down in the direction of arrow A so that the fastener cassette 58 may be slidably removed from the fastener cassette cradle 70 in the direction of arrow B as shown. Removal, or improper positioning, of the fastener cassette 58 is communicated to the control system 16 indicating that the fastener cassette 58 is not in position for operation of the portable fastener delivery system 10.

The fastener cassette 58 may further comprise a read-write device 89 that is disposed, for example, on the side of the fastener cassette 58, hereinafter referred to as a smart cassette. Generally, the smart cassette 58 would maintain real-time information relating to the number of fasteners 22 and the specific fastener 22 configurations contained within each fastener storage tube 60. Accordingly, the smart cassette 58 would constantly be aware of its contents and could relay such information to other production control systems as required.

In another form, the portable fastener delivery system 10 may comprise a plurality of fastener cassettes 58 according to specific application requirements. Accordingly, the detailed description of a single fastener cassette 58 as described herein shall not be construed as limiting the scope of the present invention.

Unloading Mechanism

Figure 12:
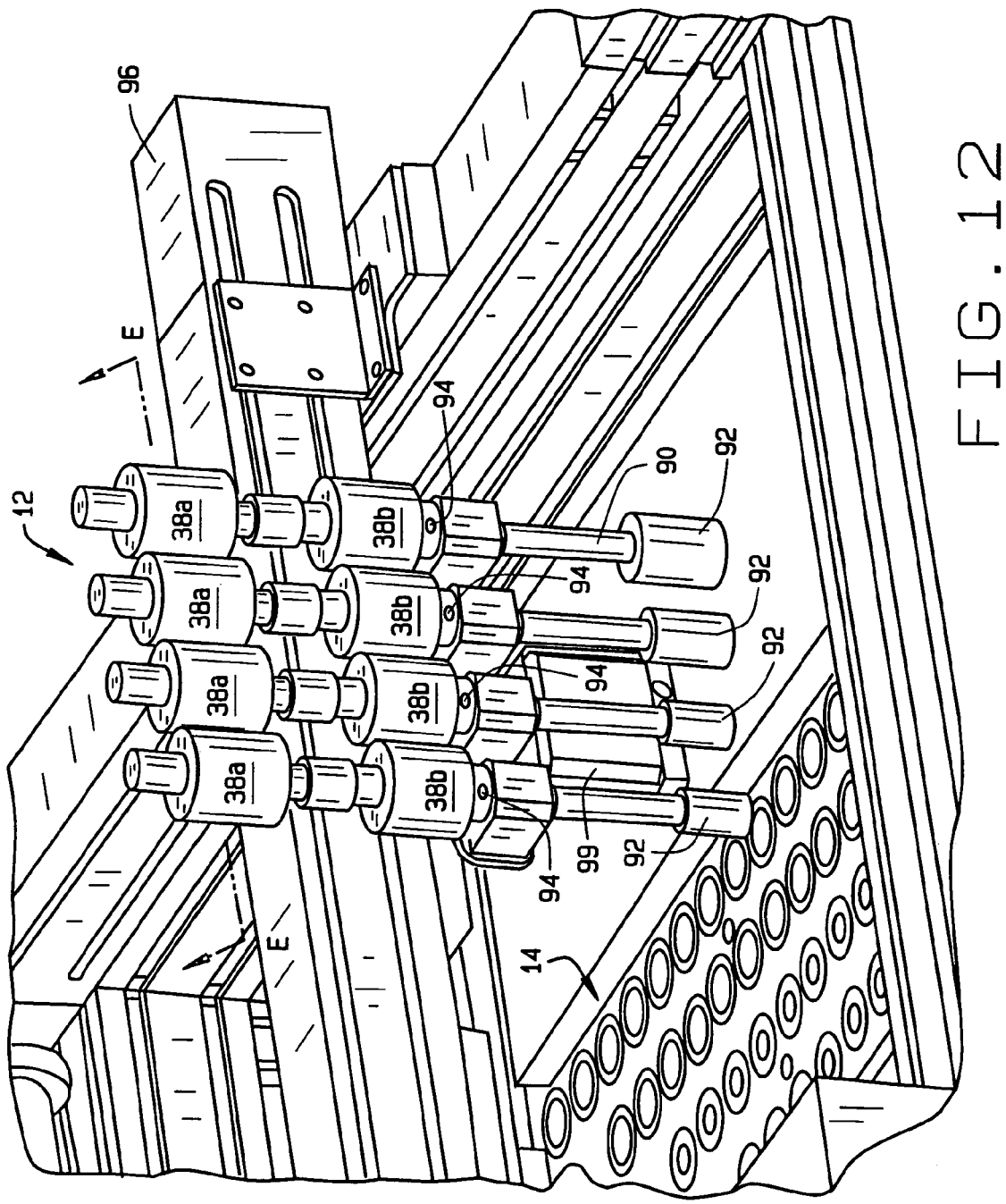
FIG. 12 is an perspective view of an unloading mechanism in accordance with the present invention.
Figure 13:
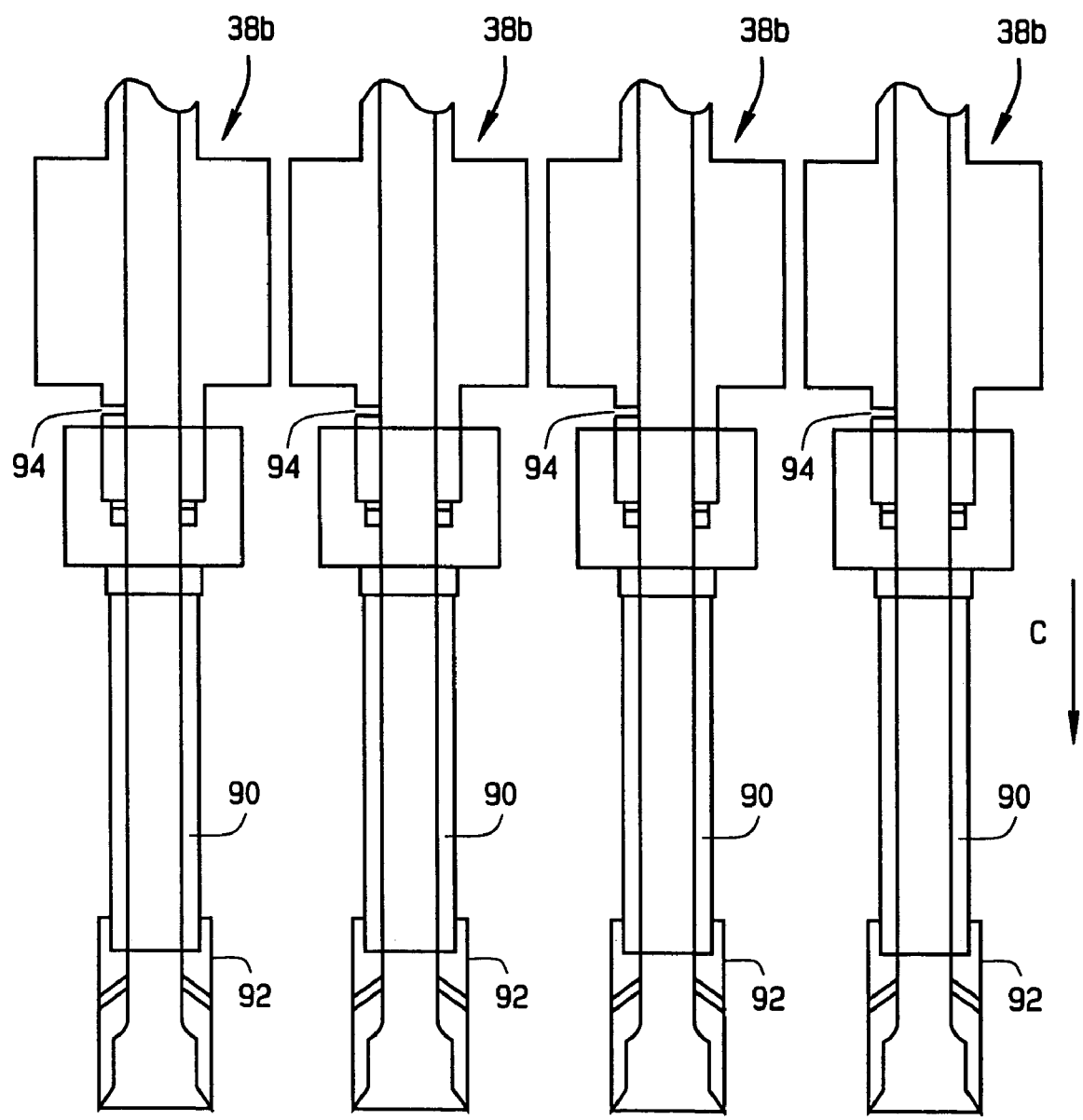
FIG. 13 is a cross-sectional view, taken along line E—E of FIG. 12, of extractor tubes and extractor catchers in accordance with the present invention.
Figure 14:
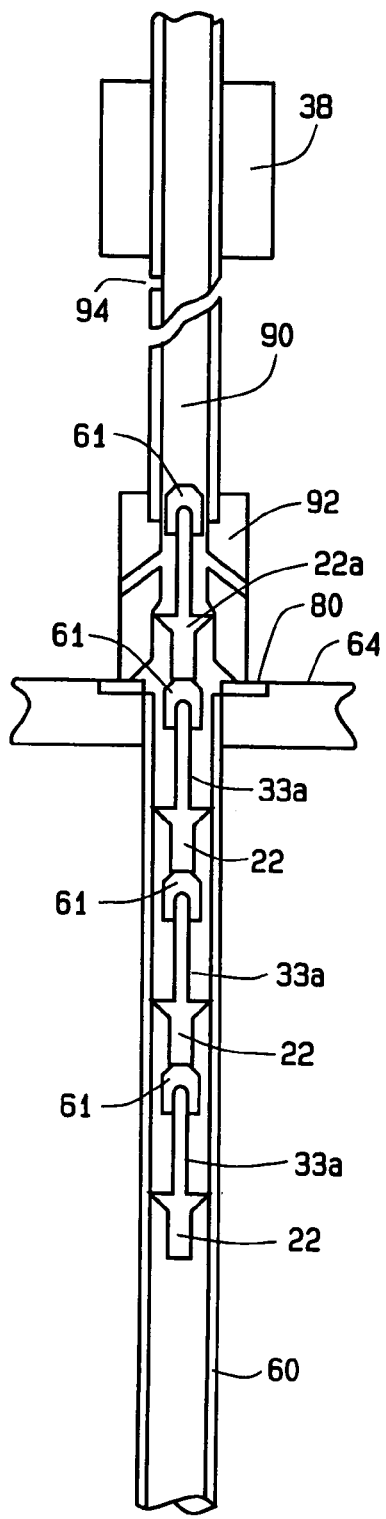
FIG. 14 is a cross-sectional view of extractor catchers abutting a fastener storage device in accordance with the present invention.

Referring now to FIGS. 12–14, the unloading mechanism 12 generally comprises an extractor tube 90 having an extractor catcher 92 attached thereto. As shown in FIG. 12, in one preferred embodiment, the unloading mechanism includes an upper vacuum generator 38a and a lower vacuum generator 38b disposed at an upper end of each extractor tube 90. The extractor catcher 92 is disposed at a lower end of the extractor tube 90. In this embodiment, each lower vacuum generator 38b includes at least one intake port 94 that facilitates air flow to thereby facilitate removing the spacer 61 while holding the fastener 22 in the extractor catcher 92. Although the vacuum generator intake port 94 is shown on the side of each lower vacuum generator 38b, the intake port 94 could be located elsewhere, for example on the top of the lower vacuum generator 38b.

Generally, the unloading mechanism 12 is positioned adjacent the fastener storage device 14 using a linear X-Y positioner 96 that is activated by the control system 16. More specifically, the linear X-Y positioner 96 positions an extractor catcher 92 adjacent the appropriate fastener storage tube 60 that contains the requested fastener. Accordingly, the X and Y position of each fastener storage tube 60 is stored within the control system 16. Additionally, the extractor tube 90, along with the extractor catcher 92 attached thereto, are translated in the vertical direction (as indicated by arrow C with a vertical axis positioner 99 as shown. The extractor catcher 92 is translated in the vertical direction in order to engage the fastener storage tube 60 for removal of the requested fastener 22. Moreover, the vertical axis positioner 99 is pneumatically controlled and is therefore activated by the pneumatic source 34. The extractor catcher 92 generally provides a sealed connection between the fastener storage tube 60, an in particular the seals 80, and the extractor catcher 92.

Figure 15:
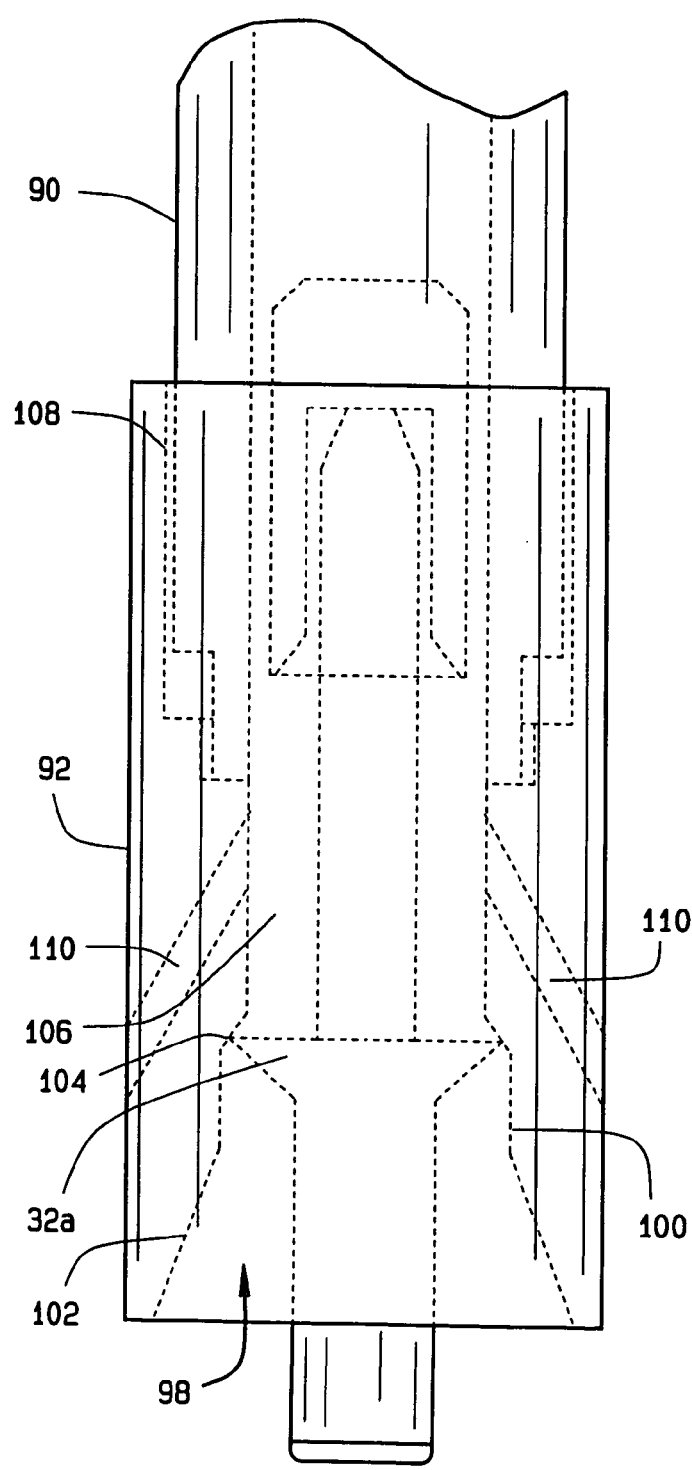
FIG. 15 is an exploded view of an extractor catcher in accordance with the present invention.

Referring to FIG. 15, the extractor catcher 92 includes an opening 98 in an end of the extractor catcher 92. The opening includes a sidewall 100 that has a first chamfered portion 102 adjacent the end of the extractor catcher 92 and a second chamfered portion 104 that leads into a channel 106. The first chamfered portion 102 of the opening 98 facilitates ease of removal of the fasteners 22 and the spacers 61 from the fastener storage tube 60. The second chamfered portion is adapted to allow the spacer 61 to pass through the extractor catcher 92 while retaining the fastener 21 therein.

The inside diameter of the channel 106 is substantially equal to the inside diameter of the extractor tube 90, both of which are slightly larger than the outside diameter Q of the spacers 61, but smaller than the head 32a of the fastener. In one preferred embodiment, a recess 108 in an end of the extractor catcher 92 opposite the opening 98 is threaded and the extractor tube 90 is threaded into the recess 108. In another preferred embodiment, an outside surface of the extractor tube 90 has an interference fit with the recess 108.

Additionally, the extractor catcher 92 includes at least one intake port 110. The intake port 110 is located such that when a fastener 22 and the related spacer 61 are drawn up into the extractor catcher 92, the intake port 110 allows air to continue to be drawn between the spacer 61 and the fastener head 32a. This allows the spacer 61 to be removed from the mandrel 33a and transported to the storage receptacle 17 by air flow through the extractor catcher 92, while holding the fastener in the extractor catcher 92.

Referring again to FIG. 12–14, in operation, the control system 16 activates the linear X-Y positioner 96 to the position unloading mechanism 12 adjacent the fastener storage device 14, and more specifically, to position an extractor catcher 92 adjacent the appropriate fastener storage tube 60. Once the proper extractor catcher 92 is positioned adjacent the appropriate fastener storage tube 60, the vertical axis positioner 99 moves the extractor tube 90 in the vertical direction until the extractor catcher 92 abuts the seal 80 as shown in FIG. 14. Once the extractor catcher 92 is positioned against the seal 80 of the appropriate fastener storage tube 60, the pneumatic source 34 then activates the vacuum generators 38. As a result, all of the fasteners 22 and related spacers 61 within the fastener storage tube 60 are lifted in the storage tube 60. When the stack of fasteners 22 and spacers 61 are lifted, the fastener head 32a of the top fastener 22 is positioned against the extractor catcher 92 second chamfered portion 104, as shown in FIG. 14. This prevents the top fastener 22 from traveling further through the extractor catcher 92. However, the spacer 61 continues to travel through the extractor catcher 92 and the extractor tube 90. The exhaust air from the vacuum generators 38 then propels the spacer 61 through the spacer transport tube 17a into the storage receptacle 17. Once the fastener head 32a of the top fastener 22 abuts the second chamfered portion 104, a seal is created at the interface between the fastener head 32a of the top fastener 22 and the extractor catcher 92. This seal cuts off the vacuum force acting on all the fasteners 22 and spacers 61 below the top fastener 22 causing the remaining fasteners 22 to drop back into the fastener storage tube 60 while the top fastener remains held within the extractor catcher 92.

In an alternate preferred embodiment, the opening 98 is chamfered from the end of the extractor catcher 92 to the point where the opening 98 leads into the channel 106. In this embodiment the chamfered opening 98 is adapted to facilitate removing the spacer 61 and fastener 22 from the storage tube 60, and to also allow the spacer 61 to pass through the extractor catcher 92 while retaining the fastener 22 therein.

Although four (4) extractor tubes 90, each having the upper and lower vacuum generators 38a and 38b, are illustrated herein, the portable fastener delivery system 10 according to the present invention may comprise any number of extractor tubes 90 and vacuum generators 38 to remove spacers 61 and fasteners 22 in accordance with specific operating requirements. Therefore, the use of four (4) extractor tubes 90 with upper and lower vacuum generators 38a and 38b shall not be construed as limiting the scope of the present invention. Additionally, although it is described herein that all the fasteners 22 and spacers 61 are lifted within the storage tube 60 when the vacuum generators 38 are activated, it is envisioned that the vacuum force created by the vacuum generators 38 can be controlled such that only one of, or less than all, the fasteners 22 and related spacers 61 are lifted within the storage tube 60 when the vacuum generators 38 are activated. Furthermore, in an alternate preferred embodiment, the vacuum force utilized by the portable fastener delivery system 10 is generated utilizing any suitable means other than the vacuum generators 38. That is the vacuum force used to remove the fasteners 22 and the spacers 61 from the tubes 60, transport the spacer 61 to the storage receptacle 17, and deliver the fasteners 22 to the work station can be generated using any suitable means. For example, the extractor tubes 90 could be directly coupled to the flexible tubing that is in communication with a remote vacuum source. The remote vacuum source would then generate a vacuum force supplied directly to unloading mechanism 12.

Control System

Figure 16:
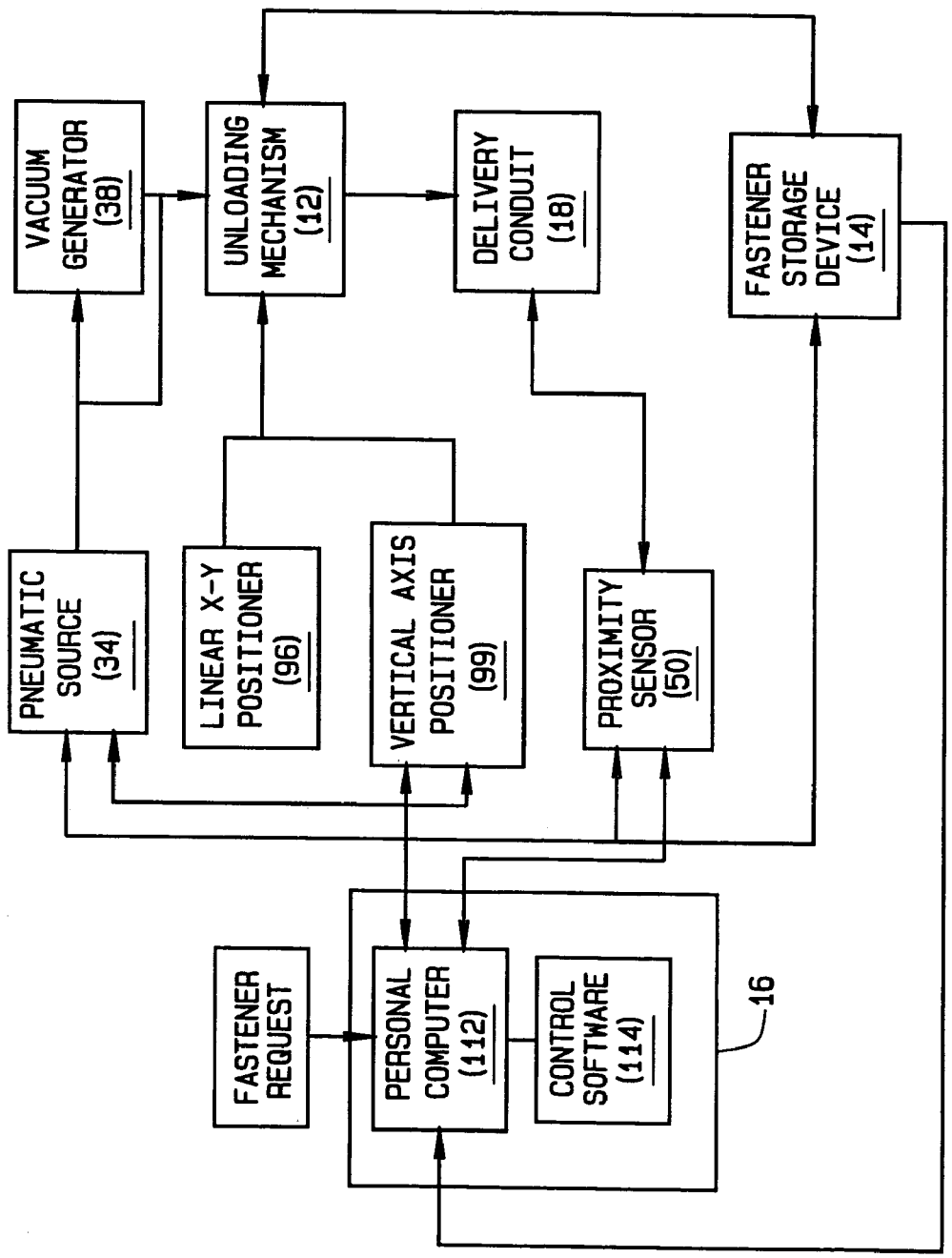
FIG. 16 is a block diagram of the communications of a control system in accordance with the present invention.

Referring to FIG. 16, the control system 16 generally comprises a computing device 112 (e.g., personal computer, programmable logic controller) that is in communication with the pneumatic source 34, the linear X-Y positioner 96, the vertical axis positioner 99 and the proximity sensor 50. Generally, the computing device 110 receives a request for a specific fastener 22 configuration from an input device such as a grip length checker, microphone, computer operated pendant, computer keyboard or touch screen, or bar code reader or other auto identification system, among others, and activates the linear X-Y positioner 96 to move the unloading mechanism 12 adjacent the fastener storage device 14. The control system 16 then activates the pneumatic source 34 to activate the vertical axis positioner 99 to move the unloading mechanism 12 down against the fastener storage device 14. Further, the pneumatic source 34 then activates the vacuum generator 38 to lift a fastener 22 and related spacer 61 into the extractor catcher 92, as previously described. The spacer 61 is then transported through the extractor tube 90 to the storage receptacle 17 while the fastener remains held in the extractor catcher 92, also as previously described.

Once the unloading mechanism 12 has removed a spacer 61 and a fastener 22 from the fastener storage device 14, the control system 16 then activates the pneumatic source 34 to move the unloading mechanism 12 up away from the fastener storage device 14. The control system 16 then activates linear X-Y positioner 96 to position the unloading mechanism 12 adjacent the delivery conduit 18. Accordingly, the pneumatic source 34 activates the vertical axis positioner 99 to move the unloading mechanism 12 down against the delivery conduit 18. The control system 16 then deactivates the vacuum generator 38, thereby causing the fastener 22 to drop into the delivery conduit 18. Once the fastener 22 passes beyond the proximity sensor 50, the control system 16 activates the pneumatic source 34 once again to provide pressurized air to deliver the fastener 22 to the work station.

In an alternate preferred embodiment, when the unloading mechanism 12 is positioned adjacent the delivery conduit 18, the proximity of the unloading mechanism 12 to the delivery conduit is such that it is not necessary to lower the unloading mechanism 12. The unloading mechanism 12 is merely positioned adjacent the delivery conduit 18 and the vacuum generator 38 is deactivated, allowing the fastener 22 to drop into the deliver conduit 18. This allows the fasteners 22 to be delivered to the work station using fewer steps, thereby reducing the delivery time of fastener 22 to the work station.

The computing device 110 preferably executes control software 114, which comprises a database having system parameters and fastener 22 parameters. The system parameters comprise for example, parameters for the fastener cassette 58 such as the position of each fastener storage tube 60, the fastener 22 configuration in each tube, and the current number of fasteners 22 in each tube. As the portable fastener delivery system 10 delivers fasteners 22, the control software 114 maintains a real-time count of the fasteners 22 remaining in the fastener cassette 58. The system parameters further comprise, but are not limited to, the amount of time that the pneumatic source 34 is activated throughout operation of the portable fastener delivery system 10, and the velocity and acceleration of the linear X-Y positioner 96, among others.

The fastener 22 parameters comprise, for example, the fastener identification, the fastener diameter and grip length, the corresponding extractor catcher 92, drop station chute 48, and amount of time that the pneumatic source 34 is activated once the fastener 22 passes beyond the proximity sensor 50. Additional fastener 22 parameters may be employed depending on the type of fasteners 22 and the configuration of the portable fastener delivery system 10.

The control system 16 preferably further comprises associated electrical and pneumatic controls such as servo motors that activate the linear X-Y positioner 96 and the vertical axis positioner 99, among others. The electrical and pneumatic controls are commonly known in the art and therefore will not be described in further detail herein. Additionally, the request for a specific fastener 22 configuration from the devices as previously set forth may be through a hard-wired connection, radio frequency (RF) transmissions, optical signals, and voice-activated signals, among others known in the art.

Operation of the Portable Fastener Delivery System

Figure 17:
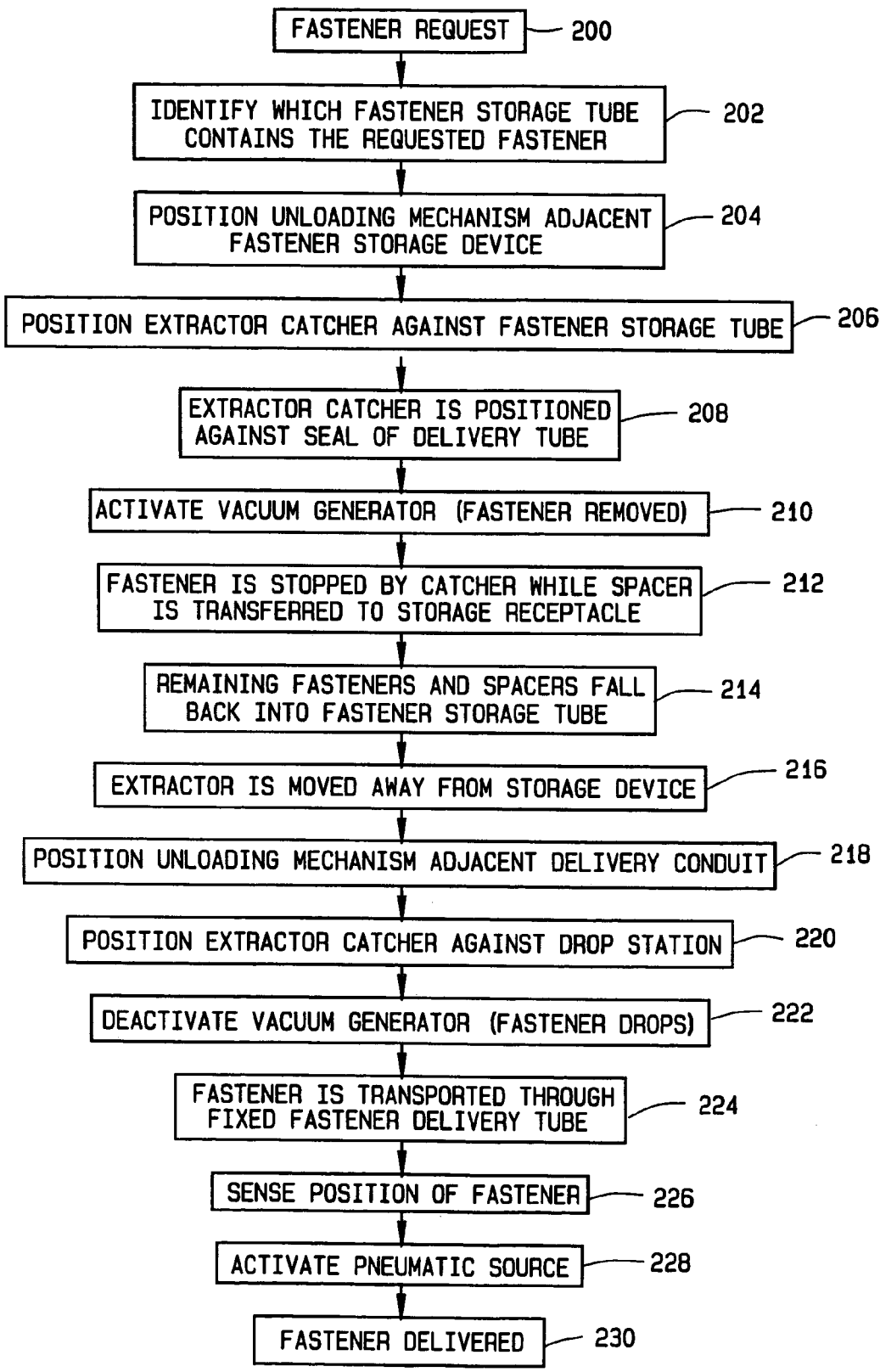
FIG. 17 is a flow diagram of a portable fastener delivery system delivering a fastener in accordance with the present invention.

In operation, the portable fastener delivery system 10 delivers fasteners 22 according to the flow diagram as depicted in FIG. 17 and the previously described figures. Initially, the control system 16 receives a request for a specific fastener 22 configuration, as indicated at step 200. The control system 16 then identifies, through the execution of the control software 114 within the computing device 112, which fastener storage tube 60 within the fastener storage device 14 contains the proper fastener 22, as indicated at step 202. Once the appropriate fastener storage tube 60 is identified, the control system 16 activates the linear X-Y positioner to position the unloading mechanism 12 adjacent the fastener storage device 14, as indicated at step 204. More specifically, the control system 16 positions the extractor catcher 92 adjacent the appropriate fastener storage tube 60, as indicated at step 206.

Once the extractor tube 90 is properly positioned, the pneumatic source 34 is activated to cause the vertical axis positioner 99 to force the extractor catcher 92 down against the seal 80 disposed around the fastener delivery tube 60, as indicated at step 208. When the extractor catcher 92 abuts the seal 80, the vacuum generator 38 is activated to cause all the fasteners 22 and related spacers 61 within the fastener storage tube 60 to move upward against the extractor catcher 92, as indicated at step 210. When the top fastener 22 abuts the second chamfered portion 104 of the extractor catcher 92 the top fastener 22 and all the fasteners 22 and related spacers 61 below it are caused to stop. However, the top spacer 61 continues to be transported through the extractor tube 90 and the spacer transport tube 17a and is thereby deposited in storage receptacle 17, as indicated at step 212. When the fastener abuts the second chamfered portion 104 of the extractor catcher 92 a seal is formed therebetween and the remaining fasteners 22 and related spacers 61 fall back down into the fastener storage tube 60, as indicated at step 214.

The pneumatic source 34 then activates the vertical axis positioner 99 to move the extractor tube 90 and the fastener held therein up and away from the fastener storage device 14, as indicated at step 216. The control system 16 then activates the linear X-Y positioner 96 to position the unloading mechanism 12 adjacent the delivery conduit 18, as indicated at step 218. More specifically, the linear X-Y positioner 96 positions the extractor catcher 92 adjacent the appropriate chute 48 of the drop plate 46. The pneumatic source 34 then activates the vertical axis positioner 99 to force the extractor catcher 92 down against the drop plate 46, as indicated at step 220. The vacuum generator 38 is then deactivated and the fastener 22 held within the extractor catcher 92 is dropped down into the fixed fastener delivery tube 42, as indicated at step 222. Accordingly, the fastener 22 is transported through the fixed fastener delivery tube 42 by gravity, as indicated at step 224.

As the fastener 22 is transported through the fixed fastener delivery tube 42 by gravity, the fastener 22 passes beyond the proximity sensor 50. The proximity sensor 50 then notifies the control system 16 that the fastener 22 has passed and is positioned within the flexible fastener delivery tube 44, as indicated at step 226. The control system 16 then activates the pneumatic source 34 providing pressurized air through the flexible fastener delivery tube 44, as indicated at step 228. The fastener 22 is thereby delivered to a work station, as indicated at step 230.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A method for delivering fasteners to a work station, said method comprising:
    loading at least one storage tube of at least one storage device with at least one fastener and at least one spacer adapted to properly orient the fastener within the storage tube;
    substantially simultaneously retrieving the fastener and the fastener spacer from the storage tube utilizing an unloading mechanism;
    substantially simultaneously retaining the fastener within an extractor catcher of the unloading mechanism and transporting the spacer to a spacer storage receptacle; and
    depositing the fastener in a delivery conduit adapted to transport the fastener to a work station.

2. The method of claim 1, wherein retrieving a fastener and spacer from the storage tube comprises utilizing a vacuum force that removes the fastener and spacer from the storage tube.

3. The method of claim 1, wherein utilizing a vacuum force comprises creating the vacuum force utilizing at least one vacuum generator included in the unloading mechanism.

4. The method of claim 2, wherein retaining the fastener within the extractor catcher and transporting the spacer to the storage receptacle comprises:
retaining the fastener within the extractor catcher utilizing the vacuum force;
substantially simultaneously transporting the spacer through the extractor catcher and the vacuum generator utilizing the vacuum force; and
propelling the spacer through a spacer transport tube to the storage receptacle utilizing a vacuum exhaust created by the vacuum generator.

5. The method of claim 4, wherein retaining the fastener within the extractor catcher and transporting the spacer to the storage receptacle further comprises:
retaining the fastener within a chamfered opening in a first end of the extractor catcher, whereby the chamfered opening leads into a channel extending through the extractor catcher; and
drawing air into the extractor catcher after the fastener has been stopped by the chamfered opening via an intake port that is in communication with the channel, thereby allowing air to flow through the extractor catcher so that the spacer is substantially simultaneously transported through the extractor catcher.

6. The method of claim 4, wherein retaining the fastener within the extractor catcher and transporting the spacer to the storage receptacle further comprises:
retaining the fastener within a chamfered portion of an opening in a first end of the extractor catcher, whereby the chamfered portion of the opening leads into a channel extending through the extractor catcher; and
drawing air into the extractor catcher after the fastener has been stopped by the chamfered portion via an intake port that is in communication with the channel, thereby allowing air to flow through the extractor catcher so that the spacer is substantially simultaneously transported through the extractor catcher.

7. The method of claim 1, wherein loading at least one storage tube comprises:
inserting the fastener into the storage tube;
subsequently inserting the spacer into the storage tube whereby a recess in the spacer having a chamfered upper portion self-locates on a mandrel of the fastener such that the mandrel is positioned loosely within the recess without manipulation of the fastener and the spacer.

8. A method for delivering fasteners to a work station, said method comprising:
substantially simultaneously retrieving a fastener and a fastener spacer from the storage tube utilizing an unloading mechanism;
substantially simultaneously retaining the fastener within an extractor catcher of the unloading mechanism and transporting the spacer to a spacer storage receptacle; and
depositing the fastener in a delivery conduit adapted to transport the fastener to a work station.

9. The method of claim 8, wherein retrieving a fastener and spacer from the storage tube comprises utilizing a vacuum force that removes the fastener and spacer from the storage tube.

10. The method of claim 8, wherein utilizing a vacuum force comprises creating the vacuum force utilizing at least one vacuum generator included in the unloading mechanism.

11. The method of claim 9, wherein retaining the fastener within the extractor catcher and transporting the spacer to the storage receptacle comprises:
retaining the fastener within the extractor catcher utilizing the vacuum force;
substantially simultaneously transporting the spacer through the extractor catcher and the vacuum generator utilizing the vacuum force; and
propelling the spacer through a spacer transport tube to the storage receptacle utilizing a vacuum exhaust created by the vacuum generator.

12. The method of claim 11, wherein retaining the fastener within the extractor catcher and transporting the spacer to the storage receptacle further comprises:
retaining the fastener within a chamfered opening in a first end of the extractor catcher, whereby the chamfered opening leads into a channel extending through the extractor catcher; and
drawing air into the extractor catcher after the fastener has been stopped by the chamfered opening via an intake port that is in communication with the channel, thereby allowing air to flow through the extractor catcher so that the spacer is substantially simultaneously transported through the extractor catcher.

13. The method of claim 11, wherein retaining the fastener within the extractor catcher and transporting the spacer to the storage receptacle further comprises:
retaining the fastener within a chamfered portion of an opening in a first end of the extractor catcher, whereby the chamfered portion of the opening leads into a channel extending through the extractor catcher; and
drawing air into the extractor catcher after the fastener has been stopped by the chamfered portion via an intake port that is in communication with the channel, thereby allowing air to flow through the extractor catcher so that the spacer is substantially simultaneously transported through the extractor catcher.

14. A method for delivering fasteners to a work station, said method comprising:
loading at least one storage tube of at least one storage device with at least one fastener and at least one spacer adapted to properly orient the fastener within the storage tube;
substantially simultaneously retrieving the fastener and the fastener spacer from the storage tube using an unloading mechanism that provides a vacuum force from a vacuum generator to remove the fastener and spacer from the storage tube;
retaining the fastener within the extractor catcher of the unloading mechanism utilizing the vacuum force;
transporting the spacer through the extractor catcher and the vacuum generator utilizing the vacuum force;
propelling the spacer through a spacer transport tube to a storage receptacle utilizing a vacuum exhaust created by the vacuum generator; and
depositing the fastener in a delivery conduit adapted to transport the fastener to a work station.

15. The method of claim 14, wherein retaining the fastener within the extractor catcher and transporting the spacer to the storage receptacle further comprises:

retaining the fastener within a chamfered opening in a first end of the extractor catcher, whereby the chamfered opening leads into a channel extending through the extractor catcher; and drawing air into the extractor catcher after the fastener has been stopped by the chamfered opening via an intake port that is in communication with the channel, thereby allowing air to flow through the extractor catcher so that the spacer is substantially simultaneously transported through the extractor catcher.

16. The method of claim 14, wherein retaining the fastener within the extractor catcher and transporting the spacer to the storage receptacle further comprises:

retaining the fastener within a chamfered portion of an opening in a first end of the extractor catcher, whereby the chamfered portion of the opening leads into a channel extending through the extractor catcher; and drawing air into the extractor catcher after the fastener has been stopped by the chamfered portion via an intake port that is in communication with the channel, thereby allowing air to flow through the extractor catcher so that the spacer is substantially simultaneously transported through the extractor catcher.

17. The method of claim 14, wherein loading at least one storage tube comprises:

inserting the fastener into the storage tube;

subsequently inserting the spacer into the storage tube whereby a recess in the spacer having a chamfered upper portion self-locates on a mandrel of the fastener such that the mandrel is positioned loosely within the recess without manipulation of the fastener and the spacer.

* * * * *